US010126442B2

(12) United States Patent
Ramsden

(10) Patent No.: US 10,126,442 B2
(45) Date of Patent: Nov. 13, 2018

(54) SPHERICAL NEUTRON DETECTOR

(71) Applicant: Symetrica Limited, Southhampton Hampshire (GB)

(72) Inventor: David Ramsden, Southhampton (GB)

(73) Assignee: Symetrica Limited, Southampton (GB)

(*) Notice: Subject to any disclaimer, the term of this patent is extended or adjusted under 35 U.S.C. 154(b) by 0 days.

(21) Appl. No.: 14/378,156

(22) PCT Filed: Feb. 13, 2013

(86) PCT No.: PCT/GB2013/050330
§ 371 (c)(1),
(2) Date: Aug. 12, 2014

(87) PCT Pub. No.: WO2013/121191
PCT Pub. Date: Aug. 22, 2013

(65) Prior Publication Data
US 2015/0001401 A1 Jan. 1, 2015

(30) Foreign Application Priority Data
Feb. 14, 2012 (GB) .................... 1202475.8

(51) Int. Cl.
G01T 3/06 (2006.01)
G01T 1/20 (2006.01)

(52) U.S. Cl.
CPC .................. G01T 3/06 (2013.01); G01T 1/20 (2013.01); G01T 1/2002 (2013.01)

(58) Field of Classification Search
CPC ....................................................... G01T 3/06
See application file for complete search history.

(56) References Cited

U.S. PATENT DOCUMENTS

| 2,681,416 | A | 6/1954 | Thompson |
| 3,382,363 | A | 5/1968 | Gant, Jr. et al. |
| 3,792,280 | A | 2/1974 | Piltingsrud |
| 7,655,921 | B2 | 2/2010 | Fehrenbacher et al. |
| 2004/0104356 | A1 | 6/2004 | Bross et al. |

FOREIGN PATENT DOCUMENTS

| CN | 101419290 A | 4/2009 |
| GB | 2124014 A | 2/1984 |
| GB | 2482024 A | 1/2012 |

(Continued)

OTHER PUBLICATIONS

R.L. Bramblett et al.; A New Type of Neutron Spectrometer; Neuclear Instruments and Methods 9; 1960.

(Continued)

Primary Examiner — Casey Bryant
(74) Attorney, Agent, or Firm — Fitzsimmons IP Law

(57) ABSTRACT

A neutron spectrometer is described. The neutron detector comprises a conversion layer provided on an outer surface of a spherical core of neutron-moderating material. The conversion layer comprises a neutron absorbing material and a phosphor material. The spherical core is arranged to receive photons emitted from the phosphor material of the conversion layer. The neutron detector further comprises a photodetector optically coupled to the spherical core and arranged to detect the photons emitted from the conversion layer.

15 Claims, 4 Drawing Sheets

(56) References Cited

FOREIGN PATENT DOCUMENTS

WO      WO 02/31536 A2     4/2002
WO    WO 2012007734 A2 *  1/2012

OTHER PUBLICATIONS

J.W. Leake; A Spherical Dose Equivalent Neutron Detector; Nuclear Instruments and Methods 45; 1966; pp. 151-156.
J.W. Leake; An Improved Sperical Dose Equivalent Neutron Detector; Nuclear Instruments and Methods 63; 1968; pp. 329-332.
S. Yamaguchi et al.; Sperical Neutron Detector for Space Neutron Measurment; Neuclear Instruments and Methods in Physics Research A 422; 1999; pp. 600-605.
G.F. Knoll; Radiation Detection and Measurement, 3rd Editio, published by John Wiley & Sons, Inc.; 2000; p. 235 (Table 8.3 Properties of Common Inorganic Scintillators).
E.S. Kuzmin et al.; Detector for the FSD Fourier-Diffractometer Based on ZnS(Ag)/6LiF Scintillation Screen and Wavelength Shifting Fiber Readout; JINR, V. 10; 2002; pp. 31-41.
J. Glodo et al.; Scintillation Properties of 1 Inch CS2LiYCI6:Ce Crystals; IEEE Transactions on Nuclear Science, vol. 55, No. 3; Jun. 2008.
S.H. Bhuiya et al.; Design of An Energy-Independent Sperical-Type Neutron Dose Monitor; Nuclear Instruments and Methods in Physics Research; 2007; pp. 629-633.
R.J. Tanner et al.; A New Design of Neutron Survey Instrument; Radiation Measuerments 45; 2010; pp. 1585-1588.

* cited by examiner

SPHERICAL NEUTRON DETECTOR

BACKGROUND OF THE INVENTION

The invention relates to a neutron detector.

Until recently most thermal neutron detectors were based on the use of proportional counters in which a gas is used which has a high cross section for the absorption of thermal neutrons. In the case of $^{10}BF_3$ neutron capture leads to the ejection of an alpha particle and a lithium nucleus which have a combined kinetic energy of up to 2.8 MeV whilst $^3$He ejects less energetic alpha and triton particles having a combined kinetic energy of up to 0.8 MeV. These reaction products produce ionisation in the gas and the electrons are accelerated towards an anode wire. During this process, the ionisation charge is magnified and a signal is recorded in an associated amplifier every time that a neutron interacts in the gas. These proportional counters are typically cylindrical and may be made in lengths of up to 1 to 2 m and contain the gas at pressures of between 100 kPa and 2 MPa.

For some applications, these detectors can also be made so that an anode wire is arranged to form the diameter of a spherical gas enclosure. These spherical proportional counters, when enclosed within a substantial moderating enclosure, have found application in the construction of portable devices for monitoring the local intensity of neutron flux in the vicinity of a particle accelerator, nuclear reactor or fuel reprocessing plant. The design of these neutron-survey instruments or dosimeters has been described in the literature [1-4]. These devices are designed to have an omni-directional response. In particular, since the health hazard presented to those working in a neutron-flux environment is very dependent on the energy of the neutrons, there is a particular need for a neutron detector that, whilst having a broad-band energy response, generates an output proportional to the dose received by the operator. Such instruments commonly use a spherical proportional counter at the centre of the detector.

Recently, the world-wide scarcity of $^3$He and operational hazards associated with the deployment of systems based on the use of the noxious gas $BF_3$ has prompted the search for alternative techniques for the detection of thermal neutrons. One possible candidate to fulfil this task is a design based on the use of $^6$Li nuclei. The lithium reaction leads to the generation of $^2$He$^{++}$ and $^3$H$^+$ fragments. These are released with a combined energy of 4.78 MeV. However, since there is no lithium based gas that can be used in a proportional counter, but this lithium reaction may be applied in a scintillation counter. There are a number of scintillation crystals containing Li atoms which could, in principle, be used. Alternatively, one can combine finely divided $^6$Li with a ZnS:Ag scintillation material to provide a large area detector. When combined with a suitable binder, layers of this mixture may be used to provide an efficient thermal neutron detector. Lithium atoms can also be combined in a scintillating glass to form either fibres or plates having good neutron detection efficiency.

Most of the applications in which neutron detectors are required, also have the requirement that they should be very insensitive to a high gamma-ray flux. Although LiI(Eu) crystals can be grown into boules having a diameter of approximately 30 mm, no attempt has yet been made to machine this material into a spherical form. Since a thickness of only 3 mm of LiI(Eu) crystals are required to fully absorb a thermal neutron and since the crystal is also highly hygroscopic, this material is not a good choice when replacing a spherical proportional counter for use as a portable neutron detector. When LiI(Eu) crystals are used in the form of a thin disc in contact with a photodetector, the detector can achieve a high gamma-ray rejection efficiency in small systems. In one known application, a small 4×4×4 mm cube of LiI(Eu) has been used at the centre of polyethylene spheres of different diameters [4]. By measuring the count-rate inside spheres of different diameters, the energy distribution of the incident neutrons can be inferred.

Two scintillation crystals that incorporate Li$^6$ nuclei have been developed recently. They are commonly referred to as 'CLYC' [5] and 'CLLB'. These materials are both hygroscopic but have other properties that make them attractive in that they could be used as the basis for a gamma-ray spectrometer and neutron detector. CLYC in particular has properties which make it especially useful for distinguishing between gamma-ray and neutrons by using pulse-shape discrimination techniques. Cerium activated lithium-glass scintillation material could in principle be used to fabricate a spherical scintillation counter for the detection of thermal neutrons. However, when used at the core of a survey instrument it would provide a less effective contribution to moderating the incident neutron flux. This is a disadvantage when seeking to design a compact, light-weight, detector system. Furthermore, cerium activated lithium-glass scintillation material provides a relatively poor gamma-ray rejection capability and it is also has a poor scintillation efficiency, that is, the number of optical photons/MeV.

Therefore there is a need to produce a more compact, light-weight neutron detector that provides an improved gamma-ray rejection capability.

SUMMARY OF THE INVENTION

According to an aspect of the invention there is a neutron detector comprising a conversion layer provided on an outer surface of a spherical core of neutron-moderating material, the conversion layer comprising a neutron absorbing material and a phosphor material, wherein the spherical core is arranged to receive photons emitted from the phosphor material of the conversion layer, the neutron detector further comprising a photodetector optically coupled to the spherical core and arranged to detect the photons emitted from the conversion layer, wherein the conversion layer is provided with a diffusely reflective surface orientated toward the centre of the spherical core arranged to diffusely reflect the photons emitted from the conversion layer and wherein the spherical core is arranged to guide the photons to the photodetector.

In accordance with some embodiments the area of the photodetector presented to the core is no more than 10% of the surface area of the core.

In accordance with some embodiments the diameter of the spherical core of neutron-moderating material is selected from the group comprising 1 cm, 2 cm, 3 cm, 4 cm, 5 cm, 6 cm, 7 cm, 8 cm, 9 cm, 10 cm, 11 cm, 12 cm, 13 cm, 14 cm and 15 cm.

In accordance with some embodiments the core is a wavelength-shifting material or compound, for example, Eljen Technology's EJ280.

In accordance with some embodiments the conversion layer comprises a substrate, and wherein the neutron absorbing material and the phosphor material are in a powdered form in a binding material on the substrate.

In accordance with some embodiments the substrate of the conversion layer is reflective for wavelengths in the region of the peak emission wavelength of the phosphor material.

In accordance with some embodiments the conversion layer and the core are in loose optical contact.

In accordance with some embodiments a layer of neutron moderating material is arranged to moderate neutrons prior to interaction in the conversion layer.

In accordance with some embodiments the photodetector comprises a wideband amplifier or may be used in conjunction with wideband amplifier.

In accordance with some embodiments a processor is arranged to receive a signal output from the photodetector and to process the signal to determine whether a neutron interaction has occurred in the detector.

In accordance with some embodiments the processor is operable to identify the occurrence of spikes in the signal by identifying changes in the signal larger than a spike threshold.

In accordance with some embodiments the processor is operable to determine the number of spikes occurring in a time interval.

In accordance with some embodiments the processor is operable to compare the number of spikes occurring in the time interval with a threshold number, and to determine whether the spikes are associated with one or more gamma-ray interactions in the wavelength-shifting light-guide or the phosphor material of the conversion layer or one or more neutron interactions in the conversion layer based on the result of the comparison.

In accordance with some embodiments the processor is further operable to provide an output signal indicative of the nature of neutron interactions determined to have occurred in the detector.

According to another aspect of the invention there is provided a method for detecting neutrons comprising providing a neutron detector comprising a conversion layer provided on an outer surface of a spherical core of neutron-moderating material, the conversion layer comprising a neutron absorbing material and a phosphor material and the spherical core being arranged to receive photons emitted from the phosphor material of the conversion layer, the method further comprising detecting photons emitted from the conversion layer into the spherical core, wherein the conversion layer is provided with a diffusely reflective surface orientated toward the centre of the spherical core arranged to diffusely reflect the photons emitted from the conversion layer and wherein the spherical core is arranged to guide the photons to the photodetector.

BRIEF DESCRIPTION OF THE DRAWINGS

The invention is now described by way of example only with reference to the following drawings in which.

DETAILED DESCRIPTION

Figure 1A:
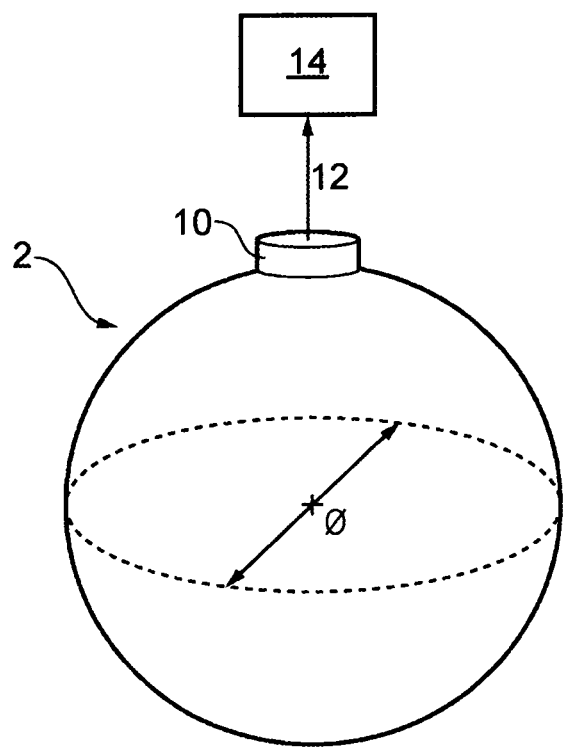
FIGS. 1A and 1B schematically show a perspective view and a cross-sectional view through the centre of a neutron detector according to an embodiment of the invention.
Figure 1B:
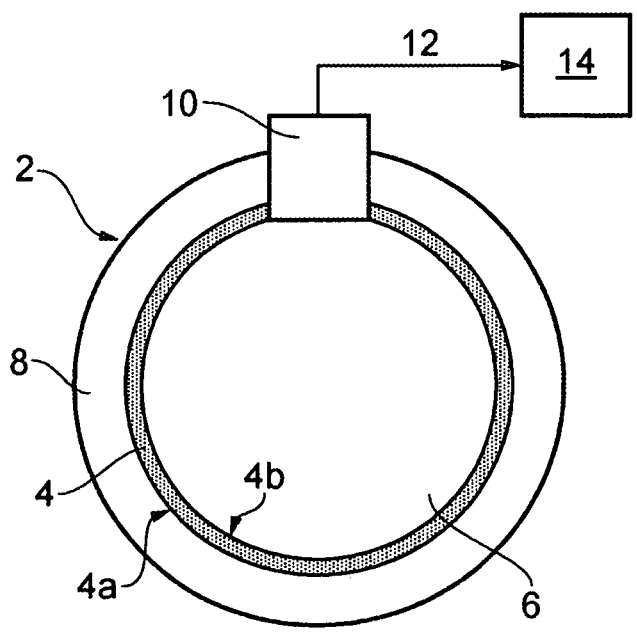

FIGS. 1A and 1B of the accompanying drawings shows schematically a neutron detector 2 according to an embodiment of the present invention.

The neutron detector 2 is generally spherical. The neutron detector 2 has a generally layered structure. The view of FIG. 1B is a cross-section through the centre of the neutron detector 2. The neutron detector 2 comprises a neutron absorbing conversion layer 4 wrapped around and in loose optical contact with a wavelength-shifting light-guide 6 in the form of a plastic sphere. In this example the wavelength-shifting light-guide 6 comprises a sphere of wavelength-shifting plastic material, e.g. based on polyvinyltoluene such as the EJ-280 materials available from Eljen Technology, Texas, USA. Other examples of possible materials include polymethyl-acrylate and polystyrene. The wavelength shifting material is used to shift the optical signal to a spectral region more suitable for the photodetector used. However, in other embodiments, the light-guide 6 may not be a wavelength shifting material, for example, the light-guide 6 may be acrylic, Perspex or other plastics material or clear plastics material. The plastic sphere is typically transparent at least for wavelengths in the region of the peak emission wavelength of the phosphor material, but may also be transparent for other wavelengths.

It will be appreciated that the light-guide 6 is illustrated as a perfect sphere. That is to say that the radius of the light-guide 6 is equal from the centre to all points of the surface of the light-guide 6. However, other shapes that are generally spherical may also be used in embodiments of the invention. That is to say that a generally spherical light-guide 6 maybe used, which is one that may not have an equal radius from the centre to all points of the surface of the light-guide 6. For example, the spherical core may be ellipsoid where the ratio between each of the characteristic radii of the ellipsoid is not less than 0.8. Furthermore, the spherical core may have a generally smooth surface. That is to say that the surface of the spherical core does not have sharp edges or corners.

The light-guide 6 is coupled to a photodetector 10, for example a large-area avalanche photo-diode, silicon photo-multiplier or a silicon drift-diode. In this example the photodetector 10 is shown coupled directly to the light guide 6, but may also be coupled to the light guide 6 via a conventional optical coupler (not shown). A short additional light-guide of a few millimeters (e.g., less than 5 mm, 4 mm, 3 mm or 2 mm) may be used to position the photodetector away from the surface of the spherical light-guide 6, since this may provide a more uniform response. The neutron detector 2 further comprises an optional outer layer 8 of an optically opaque or transparent neutron moderating material, e.g. comprising HDPE (high density polyethylene). Output signals from the photodetector 10 (schematically shown by arrow 12) are passed to a processor 14 for processing. The processor may be internal to the main detector body, or may be external.

The sensitive area of the photodetector 10 is preferably between 1% and 10%, more preferably 1% and 5%, of the surface area of the light-guide 6. The sensitive area of the photodetector 10 may be larger than the sensitive area presented to receive the photons. This will be the case if, for example, an aperture or small exit window is placed in front of a the photodetector to ensure that photons are only incident on a restricted central area of the photodetector 10 which has greater response uniformity. In an example, the diameter of the light-guide core 6 is 0.03 m. If the photodetector 10 has an area of 10% of the surface area of the light-guide 6, the photodetector 10 may be approximately 0.01×0.01 m (i.e., 1×1 cm). Therefore, a relatively small photodetector may be used.

The photodetector 10 is shown in the figure as being protruding from the detector 2. In this example, the moderating layer 8 and the conversion layer 4 are provided with an aperture for allowing the photodetector to extend from the light-guide 6. However, the photodetector 10 may be in direct contact with the light-guide 6 and the conversion layer 4 and the moderating layer 8 may cover the photodetector 10. In this example, an exit for the electrical connections between the photodetector 10 and the processor 14 is made in the conversion layer 4 and the moderator layer 8.

The characteristic scale of the detector is schematically shown in the figures (although it will be appreciated that some aspects of the figures are not drawn to scale). Thus in this example, the light-guide 6 is generally spherical having a diameter of 0.03 m. The diameter of the light-guide may also be up to 15 cm, or less, for example, 14 cm, 13 cm, 12 cm, 11 cm, 10 cm, 9 cm, 8 cm, 7 cm, 6 cm, 5 cm, 4 cm, 3 cm or 2 cm. The conversion layer (defining the neutron-sensitive active area) has a thickness of less than 2 mm or 3 mm or so, for example, less than 1 mm. The neutron moderating layer 8 in this example might have a thickness of a few cm, e.g. perhaps in the region of 1 to 5 cm, for example around 2 cm or higher, 2.5 cm or higher, 3 cm or higher, 3.5 cm or higher, 4 cm or higher or 4.5 cm or higher. In this example, the light-guide 6 has a diameter of 3 cm, the conversion layer 4 has a thickness of 1 mm and the neutron moderating cover 8 has a thickness of 1 cm, such that the diameter of the neutron detector 2 illustrated in the figure is approximately 5 cm.

In this example embodiment the conversion layer 4 comprises a conversion layer 4b, comprising a mixture of a neutron absorbing material and a phosphor material mounted on a substrate 4a. The phosphor material is a substance that exhibits luminescence, which includes phosphorescent materials, which show a slow decay in brightness (e.g., >1 ms), and fluorescent materials, where the emission decay takes place over tens of nanoseconds. The substrate is a highly-reflective substrate, for example aluminium, with a reflective face on the side of the outer layer 8. That is to say that the reflective face of the substrate 4a is orientated toward the centre of the light-guide 6. The reflective face of the substrate 4a may be provided by polishing the aluminium or by an intermediate coating, e.g. a diffusively reflecting white coating. The mixture of neutron absorbing material and phosphor material comprises powdered forms of each which are well-mixed in a resin binder and spread onto the substrate 4a, e.g. in a layer perhaps around 0.5 to 1 mm thick, and left to set. In this example, the neutron absorbing material comprises $^6$Li enriched LiF. The phosphor material comprises ZnS(Ag). In other examples the neutron absorbing material may be based on/include other neutron-absorbing elements, e.g. $^{10}$B. Equally, in other examples the phosphor material may be based on/include other phosphor material, e.g. using pure CsI or yttrium aluminium perovskite (YAP) in powdered/granular form. The conversion layer 4 is in loose optical contact with the wavelength-shifting light-guide 6 so that optical photons from the phosphor material in the conversion layer are readily coupled into the wavelength-shifting light-guide 6.

The conversion layer in this example is in loose contact and not bonded contact with the wavelength-shifting light-guide 6 such that they do not significantly disrupt total internal reflection processes within the wavelength-shifting light-guide 6. The role of the conversion layer 4a of the conversion layer 4 is to convert incidents neutrons into light.

In this example the substrate 4a of the conversion layer 4 is reflective. However, a translucent or transparent substrate may also be used. The translucent or transparent substrate may be a polyester film (e.g., Mylar or Melinex).

Figure 2A:
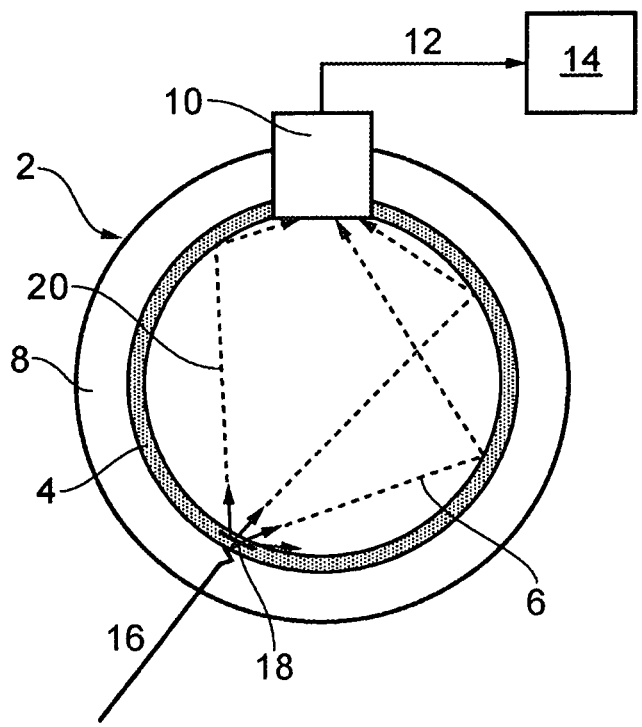
FIGS. 2A and 2B schematically show cross-sectional view through the centre of a neutron detector and schematically represent neutron interactions at different energies.
Figure 2B:
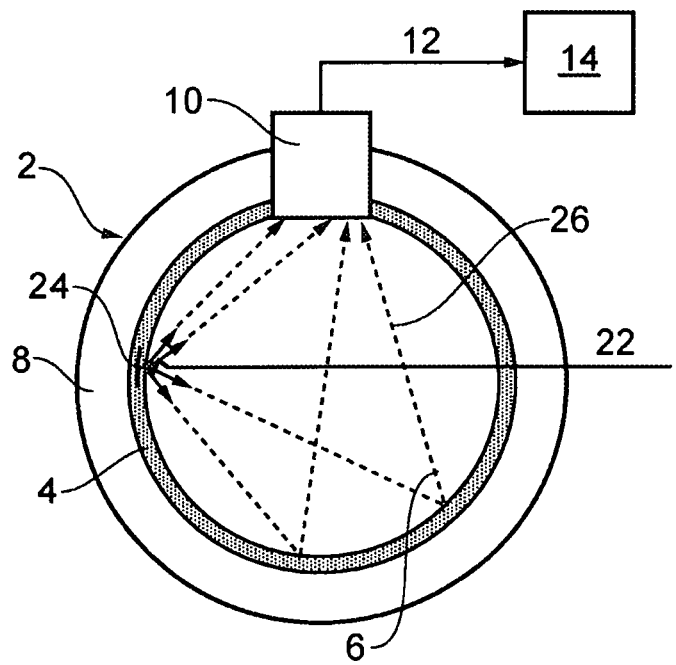

FIGS. 2A and 2B illustrate the neutron detector 2 shown in FIG. 1B and will be used to describe the operation of the neutron detector 2.

In FIG. 2A, a neutron 16 having a relatively low energy, is rapidly thermalised in the moderating layer 8 and interacts in the conversion layer 4. In this example, the neutron 16 is slowed sufficiently in the moderator layer 8 such that when the neutron 16 exits from the moderator layer 8 it will interact with the conversion layer 4. In the conversion layer 4, the neutron 16 is absorbed by the neutron absorbing material by interacting with one of the $^6$Li nuclei. The reaction results in reaction fragments that readily excite the intermixed phosphor ZnS(Ag), causing it to radiate photons 18. In general, the initial directions of the photons 18 entering the light-guide 6 will be such that the majority of these photons would not be directly guided to the photodetector 10. However, the conversion layer 4 provides a white diffusively reflecting surface to the emitted photons so that the photons may be directed to the photodetector 10 such that a good fraction (approximately 10% to 40%, e.g., 30%). The reflectivity of the conversion layer may at least in part due to the ZnS in the conversion layer. It will be appreciated that depending on the direction of the emitted photons, some photons may enter the photodetector directly without being directed by the conversion layer 4. Furthermore, the wavelength-shifting nature of the light-guide 6 means the photons 18 from the phosphor material from the ZnS(Ag) phosphor intermixed with the neutron-absorbing LiF in the conversion layer 4 may be absorbed in the light-guide 6 and corresponding longer-wavelength photons re-emitted. Significantly, however, the wave-length shifted photons will be emitted over a broad range of directions (i.e. omni-directional) such that a higher number will be guided to and reach the photodetector 10 for detection than would be the case for the photons from the phosphor material in a non-wavelength shifting light-guide. Therefore, the omni-directional wavelength shifted photons enter the light-guide 6 are guided towards the photodetector 10 as schematically shown by the dotted lines 20 in FIG. 2A. The photons are detected at the photodetector 10, and a corresponding output signal 12 is generated in the usual way. The output signals are passed to the processor 14 for processing as discussed further below. Furthermore, in this example the conversion layer 4 comprises a substrate 4a having a reflective surface. The reflective surface of the substrate may increase the number of photons entering the light-guide 6.

In FIG. 2B, a neutron 22 having moderate energy (e.g., more energy than neutron 16) passes through the moderating layer 8 and through the light-guide 6. The light-guide 6 will act as a moderator layer to the neutron 22, such that the neutron 22 will lose energy as it passes through the light-guide 6. Thus in this example, neutron 22 has sufficient energy to pass through the moderator layer 8, and the moderator layer 6 (i.e., light-guide 6), such that when the neutron 22 exits the moderator layer 6 it will interact with the conversion layer 4 and radiate photons 24. As can be seen from the figure, the neutron 22 does not interact with the conversion layer 4 upon entry in to the neutron detector 2 because the neutron 22 has too much energy. The radiated photons 24 enter the light-guide 6 and after being wavelength shifted are guided to the photodetector 10, as schematically shown by dotted-lines 26. The photons are detected at the photodetector 10 and output signal 12 are generated in the usual way. The output signals are passed to the processor 14 for processing. It will be appreciated that a neutron having very high energy (i.e., higher energy than neutron 22) may pass through the detector 2 without being thermalised.

As illustrated in FIGS. 2A and 2B, wavelength shifted photons 18, 24 are guided by the reflecting surface of the conversion layer 4, as schematically shown by the dotted lines 20, 26 and are detected at the photodetector 10. FIGS. 2A and 2B only illustrate the photons being reflected once at the conversion layer 4, but it will be appreciated that the photons may be reflected many times before being directed or guided to the photodetector 10.

Thus the detector 2 illustrated in FIGS. 1A and 1B is operable to provide sensitivity to neutrons. The neutron detector 2 provides an omni-directional, small scale detector (i.e., of the order of a few centimeters) and, as described below, may also provide a high gamma-ray rejection. Furthermore, by using a spherical design, an effective large area detector is produced with a small overall size (e.g., 5 cm diameter) that uses a small (e.g., 1×1 cm) photodetector.

In using a gamma-ray scintillator material for the wavelength shifting light guide 6, the detector design shown in FIGS. 1A and 1B is also sensitive to gamma-rays. This is because as well as acting as a wavelength-shifting lightguide for the neutron detection aspect of the detector, the light guide may also comprise the main scintillating detection body of an otherwise conventional plastic scintillator. Gamma-ray scintillation events may also occur in the ZnS(Ag) conversion layer. Thus, and as described further below, the processor 14 of the detector 2 of FIGS. 1A and 1B is configured to distinguish between events associated with neutron interactions in the conversion layer and gamma-ray interactions in the light-guide. Furthermore, the processor may be operable to derive energy loss spectra from the output signal 12 from the photodetector 10 which are not deemed to be associated with neutron interaction events in the conversion layer 4, for example because the output signals do not exceed a pre-defined threshold, or based on some other selection criterion, e.g. pulse shape considerations. On the assumption that output signal events which are not deemed to be neutron interaction events are associated with gamma-ray interactions in the light-guide 6, an energy loss spectrum for these events, e.g. determined in any conventional manner, could provide some information on sources of gamma-rays in the environment of the detector. This is in addition to the neutron detection capability of the detector in accordance with the techniques described above.

Aspects of embodiments of the invention relating to the distinguishing of neutron events from gamma-ray events will now be described. The methods described in GB 2482024 A may be used for distinguishing between gamma-ray events and neutron events occurring in the detector according to an embodiment of the invention. A method described in GB 2482024 A for distinguishing between gamma-ray events and neutron events is now described.

Gamma-ray scintillation events which occur in both the ZnS(Ag) conversion layer and in the plastic wavelength shifting light-guide 6 of the neutron detector of FIGS. 1A and 1B typically give rise to fast single pulses from the photodetector 10, typically with durations of less than 20 ns.

(Some gamma-ray interactions may also occur in the conversion layer 4 and these give rise to similarly fast photodetector signals.)

Figure 3:
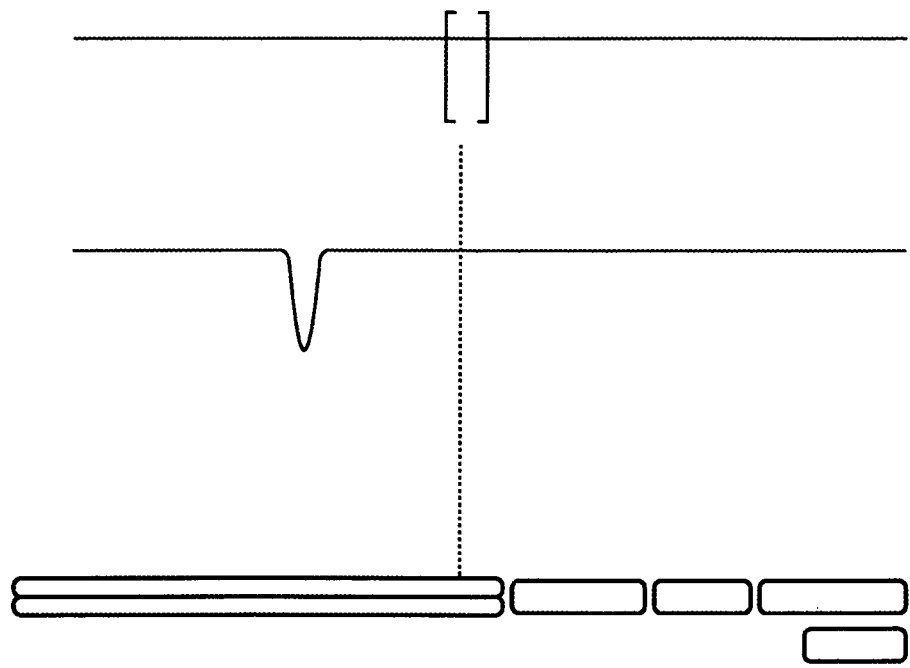
FIG. 3 schematically shows an oscilloscope trace representing an output signal for the neutron detector of FIGS. 1A and 1B seen in response to a gamma-ray detection.

FIG. 3 shows an oscilloscope screen shot representing the output pulse from the photodetector 10 of the neutron detector of FIGS. 1A and 1B for a single gamma-ray scintillation event in the detector, which may be from the wavelength shifting light-guide 6 or the conversion layer 4. The detection electronics in this example are such that an increase in light intensity at the photodetector results in a negative going pulse. FIG. 3 comprises an upper panel showing the gamma-ray detection event on a first time base and vertical scale and a larger lower panel showing the detection event on a magnified scale (about 20× in time base and 4× in amplitude). Thus the full width at half maximum of the pulse is around 40 ns. The vertical scale is arbitrary and not significant here.

Gamma-ray detection events are relatively consistent in the detection signals they produce. Most gamma-ray detection in the wavelength shifting light guide will produce signals having broadly the same characteristics as seen in FIG. 3, although will typically be of differing amplitudes according primarily to the energy deposited in the scintillation event in the light guide.

The photodetector 10 response seen for neutron detection events in the conversion layer 4 of the detector of FIGS. 1A and 1B is typically different. ZnS(Ag) phosphor, as used in the conversion layer in the example of FIGS. 1A and 1B, is commonly reported to have a principal light decay-time of 200 ns when excited by alpha particles [6]. However, in practice the ZnS(Ag) response to alpha particles is not this simple. For example, some reports indicate the pulse decaytime might differ from between 10 ns for gamma-ray events and 70 ns for neutron events. Furthermore, Kuzmin et al [7] have demonstrated that light-emission for ZnS(Ag) can continue for perhaps as long as 1 ms after a detection event.

The output response from the neutron detector 2 of FIGS. 1A and 1B for neutron detection events in the conversion layer is also complicated by what has been found to be a relatively large variation in light-emission efficiency for the conversion layer. This variation may be due to a dependence on both the residual energy that triton and alpha particles have when they emerge from a microcrystal of LiF to interact with the ZnS(Ag) component of the layer, and the depth of the neutron interaction within the conversion layer. These types of effect means that not only is the light output for neutron detection events relatively complex, the extent of complexity between events shows significant degrees of variation. This is demonstrated by FIGS. 4 and 5.

Figure 4:
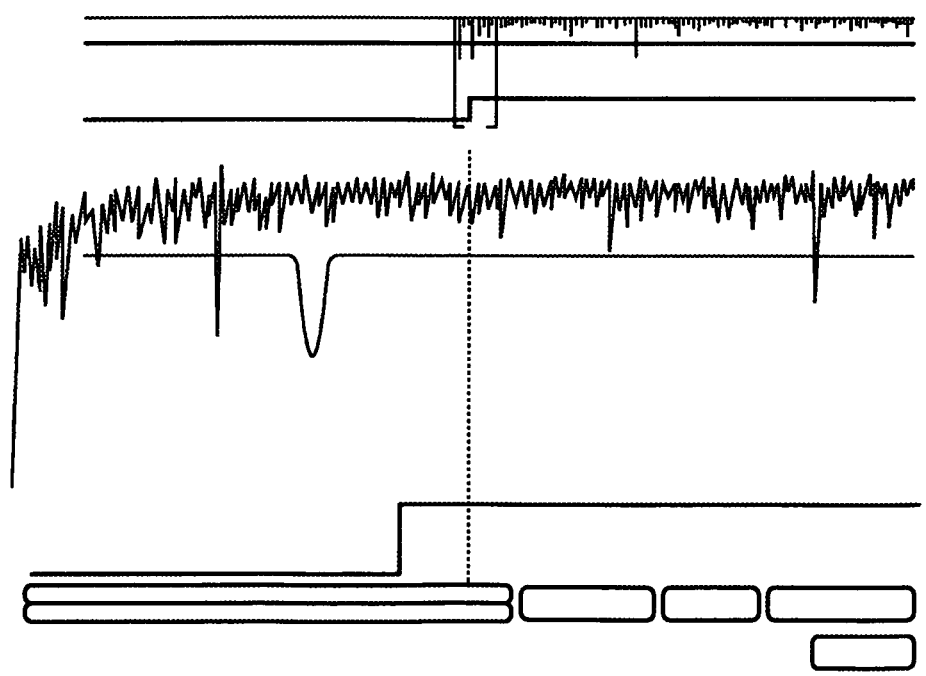
FIG. 4 is schematically shows an oscilloscope trace representing an output signal for the neutron detector of FIGS. 1A and 1B seen in response to a neutron detection event.
Figure 5:
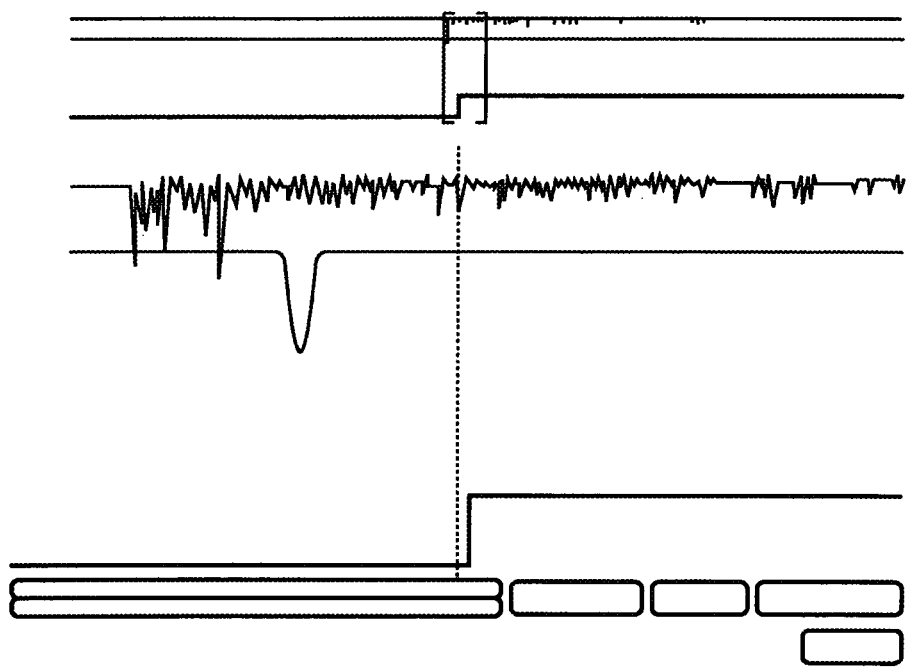
FIG. 5 is similar to FIG. 4 but shows a trace for a different neutron detection event.

FIGS. 4 and 5 respectively show oscilloscope screen shots representing the output from the photodetector 10 of the neutron detector 2 of FIGS. 1A and 1B for two different neutron detection events. The detection electronics for the photodetector 10 comprise a conventional wideband frontend amplifier to allow fine structure in the output signal to be resolved, e.g. detail on a scale of around 30 ns. Each of FIGS. 4 and 5 comprises an upper panel showing their respective neutron detection events on a first time base and vertical scale and a larger lower panel showing the detection event on a magnified scale (about 20× in time base and 4× in amplitude). The full widths of the traces for the lower panels is around 20 μs The vertical scale is arbitrary but consistent between the two figures.

As can clearly be seen from FIGS. 4 and 5, very different and complex response characteristics can be seen for neutron detection events when using sufficiently fast detection electronics. As a consequence of the typical response behaviour for both gamma-ray and neutron detection events, the inventors have found it is often not possible to reliably identify neutron events against the presence of a high flux of gamma-rays, for example, from 60Co, simply by integrating the light signal.

To address these issues the inventors have developed a discrimination technique that has been found to be well suited for use with gamma-ray spectrometer designs in accordance with embodiments of the invention. The discrimination technique is based, for example, on an analysis of signals obtained from the photodetector 10, which in this case is a conventional photomultiplier. The signals are pre-processed using a conventional wideband (fast) amplifier (e.g. around 50-100 MHz) and filter circuitry to provide signals similar to those shown in FIGS. 4 and 5. This is followed by a conventional discriminator and fast-counting system. This can be implemented using, for example, an FPGA or micro-controller. This circuit approach is quite different to a conventional approach based on an assumed scintillation decay time of 200 ns. For example, there may be no use of conventional scintillation-counter pre-amplifier and pulse-shaping electronics.

Thus a wideband front-end amplifier for the photodetector is used which is able to respond both to the very fast individual gamma-ray signals (i.e. signals associated with gamma-ray scintillation events in the light-guide 6 of FIGS. 1A and 1B), and to resolve the sub-structure in the neutron induced signals. As can be seen from FIGS. 4 and 5, a neutron event is typically characterised by an intense train of pulses which decay in both amplitude and frequency, e.g. over time periods of up to 1 ms and beyond. However, since the neutron interactions occur at different depths in the conversion layer, the characteristics of the bursts can be very variable. The gamma-ray signals, on the other hand, are typically characterised by a single fast pulse in the output signal from the photodetector, such as seen in FIG. 3. Gamma-ray signals for different events vary in amplitude, primarily according to the energy of the incident gamma-ray, but also in dependence on geometric effects, e.g. based on where in the wavelength shifting light-guide the interaction occurred. In this regard, it can be difficult to distinguish single gamma-ray interaction events from individual features in the more complex neutron interaction events.

Figure 6:
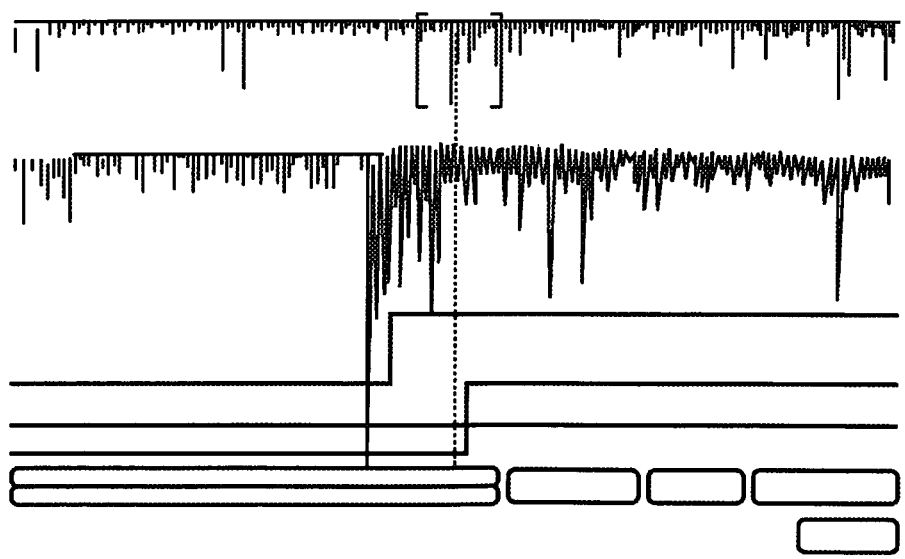
FIG. 6 is similar to FIGS. 4 and 5 but shows a trace of a different neutron detection event against a background of gamma-ray detection events.

FIG. 6 shows an oscilloscope trace which is similar to and will be understood from those of FIGS. 4 and 5. However, whereas FIGS. 4 and 5 represent different responses for neutron interaction events in isolation, FIG. 6 shows a neutron interaction event occurring against a significant gamma-ray background flux.

For the upper traces in each of FIGS. 4 to 6 the signals associated with the respective neutron events begin around half way along the trace. In both FIGS. 4 and 5 (no gamma-ray background) the respective traces for the time before the neutron interaction is "quiet". This means neutron events could be easily identified in these circumstances using basic techniques, for example, by looking for a train of pulses occurring above a predefined threshold signal level which can be set relatively low. However, for FIG. 6 (with gamma-ray background) the trace before the neutron interaction contains many peaks associated with gamma-ray interactions in the wavelength shifting light-guide. This complicates the process of identifying the occurrence of the neutron interaction event. For the example shown in FIG. 6, the neutron interaction event is still relatively apparent from the number of strong peaks occurring in the short period immediately after the event starts, even though the later structure is lost against the gamma-ray background. However, the variation in neutron signals discussed above means other events can be harder to identify. For example, the event represented in FIG. 5 would be much harder to see against a high gamma-ray background than the event of FIG. 4.

In seeking to address this issue, the Inventors have explored various signal-processing criteria to identify a neutron pulse reliably in the presence of a large flux of gamma-rays.

One approach is to identify peaks in the signal, e.g. using conventional signal processing techniques to determine the number of events exceeding a predefined threshold, and to count the number of peaks occurring in successive time intervals, for example in intervals of a few microseconds or so. (It will be appreciated that "exceeding" a threshold is intended here with reference to the magnitude of the signals, so that for negative going pulses, the threshold is "exceeded" if the signal falls below a predefined signal level.) Conventional pulse counting techniques may be used, e.g. using a simple comparator for comparing the output from the photodetector (post amplification and filtering) with a trigger threshold level. An appropriate trigger threshold level may be selected through calibration. For example by being set high enough to ensure there are zero (or very few) pulses counted when there is no gamma or neutron source nearby, while being set low enough to ensure an appropriate number of pulses are counted when a calibration source is nearby. The comparator output may be coupled to a digital counter which increments for each "up-down toggle" of the output to count pulses. The counter value may then be read at fixed time intervals to show the number of pulses detected in the most recent time interval. The number of identified peaks in the time interval may then be compared with a threshold number of peaks for the time interval. This threshold number may be referred to as a "digital" or "pulse count" threshold P for the number of peaks. If the pulse count for a given time period exceeds the pulse count threshold P it is assumed a neutron detection event has occurred. A consecutive number of time intervals for which the pulse count threshold P is exceeded may be considered as being associated with a single event.

However, using this approach of counting peaks in successive time intervals has highlighted some of the issues associated the wide variations that exist in the characteristics of individual neutron signals. For example, the number of neutron events identified per unit time with this approach is found to depend quite strongly on the selected threshold signal for identifying a peak.

The inventors have recognized that under typical conditions the initial pulse rate (pulse per time interval) at the start of a neutron event is typically the highest during that event and the first 5 μs might typically contain 25 or more pulses. However, there is a broad range in this and the number of peaks in a 5 μs period might range from say 8 to around 100, for example. The selection of the specific digital 'threshold' P (i.e. the minimum number of pulses counted in a time interval that is taken to indicate a neutron event) impacts on the neutron detection efficiency and the ability to suppress the effects of gamma-ray background.

During use an average background gamma-ray pulse-rate may be determined by monitoring the number of pulses occurring during successive 5 μs intervals which are deemed not to relate to a neutron event (because the pulse count rate is below the pulse count threshold P). The data may thus be used to derive a value for the average number of gamma-rays/5 μs (g). The inventors have found more reliable results may be obtained if the pulse count threshold P is modified as a function of this value "g" for the average number of gamma-rays per 5 µs period. The correction function f(g) may be determined experimentally by measuring changes in the determined neutron detection rate seen for a known neutron flux for different known background gamma-ray dose-rates.

To perform the calibration according to one example, the detector may be placed in a high-neutron-flux, low-gamma-flux environment, and the neutron detection rate measured. The gamma flux incident on the detector may then be increased (e.g. by moving a gamma-ray source closer to the detector), and the digital threshold may then be raised until the detected count rate matches the benchmark rate observed at low gamma flux. The gamma rate may be measured internally and this internal gamma measurement is associated with the correction to the threshold required. This can be repeated for different strengths of gamma flux to build up sufficient data points to fit a function, namely f(g).

Thus a function f(g) may be derived which may be helpful in improving the constancy of neutron detection efficiency against varying gamma-ray backgrounds. For example, in order to maintain a relatively constant neutron sensitivity against a changing gamma-ray background, one might set the digital pulse count threshold P for each time period according to the following criterion;

digital threshold $P=25+f(g)$ where g is a running average of the gamma-ray count rate for a preceding period, e.g., a preceding period of tens of milliseconds, or perhaps longer, e.g., on the order of a few seconds. The averaging time for g may be selected according to the expected rate of change in background gamma-ray flux.

It will be appreciated that instead of modifying the pulse count threshold P in dependence on the average gamma-ray flux, an alternative approach would be to keep the pulse count threshold P fixed, but modify the duration of the time period over which pulses are counted.

Two techniques for applying this adaptive threshold have been used by the inventors. In one approach the timing intervals are unrelated to the times of arrival of neutron signals. In this method the digital threshold P may not be exceeded until the neutron signal spans the second of the 5 µs timing intervals. In the second approach, use is made of the fact the initial pulse in the train of pulses generated by a neutron is normally larger than any of the gamma-ray signals. In this way, the digital threshold can be set from the point of the onset of the neutron event. The decision regarding whether to operate in this triggered or the alternative, repetitive method can be selected on the basis of the characteristics of the particular detector design.

In particular, the processor 14 may be operable such that, (i) if the number of spikes in the time interval is less than the threshold number the spikes are determined to be associated with gamma-ray interactions in the wavelength-shifting light-guide, and (ii) if the number of spikes in the time interval is more than the threshold number the spikes are determined to be associated with a neutron interaction in the conversion layer.

The threshold number and/or the duration of the time interval may be dependent on a number of gamma-ray interactions determined to have occurred in at least one previous time interval. The threshold number and/or the duration of the time interval may be dependent on a determined average number of gamma-ray interactions determined to have occurred a number of previous time intervals. The functional form of the dependence of the threshold number and/or the duration of the time interval on the number of gamma-ray interactions in the previous time intervals may be determined through a calibration exercise. The functional form may be a non-linear fit to results of the calibration exercise.

A neutron spectrometer is described. The neutron detector comprises a conversion layer provided on an outer surface of a spherical core of neutron-moderating material. The conversion layer comprises a neutron absorbing material and a phosphor material. The spherical core is arranged to receive photons emitted from the phosphor material of the conversion layer. The neutron detector further comprises a photodetector optically coupled to the spherical core and arranged to detect the photons emitted from the conversion layer.

REFERENCES

1. J. W. Leake "A spherical dose-equivalent neutron detector" Nuclear Instruments and Methods 45 (1965), pages 151-156.
2. J. W. Leake "An improved spherical dose equivalent neutron detector" Nuclear Instruments and Methods Volume 63, Issue 3, (1968), pages 329-332.
3. R. J. Tanner, J. S. Eakins, and L. G. Hager, "A New Design of Neutron Survey Instrument", Radiation Measurements 45 (2010), pages 1585-1588.
4. R. L. Bramlett, R. I. Ewing, and T. W. Bonner, A New Type of Neutron Spectrometer", Nuclear Instruments and Methods 9 (1), (1960).
5. J Glodo et al, "Scintillation properties of 1 inch $Cs_2LiYCl_6$:Ce" IEEE Trans Nuclear Science 55 (2008), pages 1206-1209.
6. G F Knoll, Radiation Detection and Measurement, 3rd Edition, published by John Wiley & Sons Inc 2000, p 235.
7. E. S. Kuzmin, A. M. Balagurov, G. D. Bokuchava et al. "Detector for the FSD Fourier-Diffractometer based on ZnS(Ag)/6LiF scintillation screen and wavelength shifting fibers readout" JINR E13-2001-204, Dubna, 2001.

The invention claimed is:
1. A neutron detector comprising a conversion layer provided on an outer surface of a spherical core of neutron-moderating material, the conversion layer comprising a neutron absorbing material and a phosphor material, wherein the spherical core is arranged to receive photons emitted from the phosphor material of the conversion layer, the neutron detector further comprising a photodetector optically coupled to the spherical core and arranged to detect the photons emitted from the conversion layer, wherein the conversion layer provides a diffusely reflective surface orientated toward the centre of the spherical core and arranged to diffusely reflect the photons emitted from the conversion layer and which have entered the spherical core back into the core to guide the photons to the photodetector.
2. The neutron detector according to claim 1, wherein the area of the photodetector presented to the core is no more than 10% of the surface area of the core.
3. The neutron detector according to claim 1, wherein the diameter of the spherical core of neutron-moderating material is selected from the group comprising 1 cm, 2 cm, 3 cm, 4 cm, 5 cm, 6 cm, 7 cm, 8 cm, 9 cm, 10 cm, 11 cm, 12 cm, 13 cm, 14 cm and 15 cm.
4. The neutron detector according to claim 1, wherein the core is a wavelength-shifting material and generates wavelength-shifted photons therefrom.
5. The neutron detector according to claim 1, wherein the conversion layer comprises a substrate, and wherein the neutron absorbing material and the phosphor material are in a powdered form in a binding material on the substrate.

6. The neutron detector according to claim 5, wherein the substrate of the conversion layer is reflective for wavelengths in the region of the peak emission wavelength of the phosphor material.

7. The neutron detector according to claim 1, wherein the conversion layer and the core are in loose optical contact.

8. The neutron detector according to claim 1, further comprising a layer of neutron moderating material arranged to moderate neutrons prior to interaction in the conversion layer.

9. The neutron detector according to claim 1, wherein the photodetector comprises a wideband amplifier.

10. The neutron detector according to claim 1, further comprising a processor arranged to receive a signal output from the photodetector and to process the signal to determine whether a neutron interaction has occurred in the detector.

11. The neutron detector according to claim 10, wherein the processor is operable to identify the occurrence of spikes in the signal by identifying changes in the signal larger than a spike threshold.

12. The neutron detector according to claim 11, wherein the processor is operable to determine the number of spikes occurring in a time interval.

13. The neutron detector according to claim 12, wherein the processor is operable to compare the number of spikes occurring in the time interval with a threshold number, and to determine whether the spikes are associated with one or more gamma-ray interactions in the wavelength-shifting light-guide or the phosphor material of conversion layer or one or more neutron interactions in the conversion layer based on the result of the comparison.

14. A neutron detector according to claim 10, wherein the processor is further operable to provide an output signal indicative of the nature of neutron interactions determined to have occurred in the detector.

15. A method for detecting neutrons comprising providing a neutron detector comprising a conversion layer provided on an outer surface of a spherical core of neutron-moderating material, the conversion layer comprising a neutron absorbing material and a phosphor material and the spherical core being arranged to receive photons emitted from the phosphor material of the conversion layer, the method further comprising detecting photons emitted from the conversion layer into the spherical core, wherein the conversion layer is provided with a diffusely reflective surface orientated toward the centre of the spherical core arranged to diffusely reflect the photons emitted from the conversion layer back into the core and wherein the spherical core is arranged to guide the photons to the photodetector.

* * * * *